US012777987B2

(12) United States Patent
Kachlany et al.

(10) Patent No.: US 12,777,987 B2
(45) Date of Patent: Nov. 3, 2026

(54) TILLING GARDENING APPARATUS AND METHODS OF USE

(71) Applicant: GARDINNOVATIONS, Bridgewater, NJ (US)

(72) Inventors: Scott Kachlany, Bridgewater, NJ (US); Teri Chu, Sacramento, CA (US)

(73) Assignee: Gardinnovations, Bridgewater, NJ (US)

( * ) Notice: Subject to any disclaimer, the term of this patent is extended or adjusted under 35 U.S.C. 154(b) by 325 days.

(21) Appl. No.: 18/597,635

(22) Filed: Mar. 6, 2024

(65) Prior Publication Data

US 2024/0298558 A1 Sep. 12, 2024

Related U.S. Application Data

(60) Provisional application No. 63/450,521, filed on Mar. 7, 2023.

(51) Int. Cl.

| | |
|---|---|
| ***A01B 1/16*** | (2006.01) |
| ***A01B 1/06*** | (2006.01) |
| ***A01B 1/10*** | (2006.01) |
| ***A01B 1/12*** | (2006.01) |
| ***A01B 1/20*** | (2006.01) |

(52) U.S. Cl.

CPC ................ *A01B 1/065* (2013.01); *A01B 1/10* (2013.01); *A01B 1/16* (2013.01); *A01B 1/20* (2013.01); *A01B 1/12* (2013.01)

(58) Field of Classification Search

CPC .. A01C 5/02; A01C 5/04; A01B 1/165; A01B 1/18; A01B 1/20; A01B 1/065; A01B 1/10; A01B 1/12; A01B 1/16

See application file for complete search history.

(56) References Cited

U.S. PATENT DOCUMENTS

| | | | | |
|---|---|---|---|---|
| 3,938,249 A * | 2/1976 | Chacon | A01G 3/00 | 30/DIG. 7 |
| 4,213,504 A * | 7/1980 | Schneider | A01B 33/06 | 172/41 |
| 4,293,041 A * | 10/1981 | Holmstadt | A01B 33/06 | 172/39 |
| 4,364,437 A * | 12/1982 | Haapala | A01B 1/10 | 172/549 |
| 4,456,075 A * | 6/1984 | Hostetter | A01B 1/16 | 175/398 |

(Continued)

FOREIGN PATENT DOCUMENTS

| | | | |
|---|---|---|---|
| AT | 521986 A1 * | 6/2020 | B01F 27/1145 |
| DE | 19623721 A1 * | 12/1997 | A01B 1/065 |

(Continued)

*Primary Examiner* — Adam J Behrens

(74) *Attorney, Agent, or Firm* — Wood, Phillips, Katz, Clark & Mortimer

(57) ABSTRACT

A gardening apparatus having, in one form, a shaft for being operatively connected to and rotated by a motor. The shaft including at least one vane extending therefrom and having a plurality of tines extending therefrom. The vane further having a raised wall extending therefrom. In another form, the apparatus includes a handpiece having a power source, motor, and a drive system operatively connected between the motor and the shaft to perform a variety of tasks such as tilling, hole digging, and/or weed removal.

12 Claims, 4 Drawing Sheets

(56) References Cited

U.S. PATENT DOCUMENTS

| | | | | | |
|---|---|---|---|---|---|
| 4,603,744 | A * | 8/1986 | Ramirez | A01B 1/16 294/50 |
| 5,056,605 | A * | 10/1991 | Bond | A01B 1/065 172/111 |
| 5,133,269 | A * | 7/1992 | Charneski | A01C 5/02 175/21 |
| 5,338,078 | A * | 8/1994 | Basek | A01B 1/165 294/50.5 |
| 5,377,374 | A * | 1/1995 | Green | A01G 3/08 7/114 |
| 5,850,882 | A * | 12/1998 | Link | A01B 1/065 172/555 |
| 5,862,658 | A * | 1/1999 | Howard | A01D 34/84 172/111 |
| 6,352,122 | B1 * | 3/2002 | Love | A01B 1/00 172/532 |
| 6,595,298 | B1 * | 7/2003 | Crady | A01B 1/065 172/111 |
| 6,615,928 | B2 * | 9/2003 | Dueitt | A01B 1/065 30/165 |
| 9,736,972 | B1 * | 8/2017 | Pope | A01B 1/165 |
| 10,257,971 | B2 * | 4/2019 | Kittelson | A01B 33/085 |
| 11,619,101 | B2 * | 4/2023 | Huang | E21B 11/005 175/170 |
| 2004/0000431 | A1 * | 1/2004 | Van Denham | A01C 5/02 175/323 |
| 2012/0181088 | A1 * | 7/2012 | Tucceri | E21B 11/005 175/394 |
| 2017/0339817 | A1 * | 11/2017 | Pomeroy | A01B 1/065 |
| 2018/0070521 | A1 * | 3/2018 | Kittelson | A01B 33/085 |
| 2021/0378157 | A1 * | 12/2021 | Shin | A01B 1/065 |
| 2022/0120141 | A1 * | 4/2022 | Huang | A01C 11/04 |

FOREIGN PATENT DOCUMENTS

| | | | | |
|---|---|---|---|---|
| GB | 2426174 | A * | 11/2006 | A01B 1/165 |
| KR | 20170101019 | A * | 9/2017 | A01B 1/02 |
| WO | WO-9705761 | A1 * | 2/1997 | A01B 1/227 |

* cited by examiner

TILLING GARDENING APPARATUS AND METHODS OF USE

PRIORITY

This application claims priority of U.S. Provisional Patent Application Ser. No. 63/450,521, filed Mar. 7, 2023, the entire contents of which is incorporated herein by reference.

FIELD OF THE INVENTION

The present invention relates generally to a handheld apparatus or device and attachments thereof which are used to perform a variety of gardening tasks.

BACKGROUND OF THE INVENTION

To turn the soil in a garden, and rip out weeds, a garden tiller is typically used. However, it is very difficult or impossible to use a standard garden tiller in averaged-sized home gardens and raised beds. Furthermore, a garden tiller is not practical for removing weeds from smaller areas or spaces around existing plants or trees. Garden tillers are also relatively large and heavy. Thus, while a garden tiller is good for large areas (and for people who are strong enough to lug them around), it is not ideal for relatively smaller spaces, or for older gardeners who are not able to operate and lift the heavy equipment. Furthermore, standard tillers require gas for operation.

There further remains a need for providing an improved, lightweight gardening device that allows for the performance of a variety of gardening tasks and which is amenable to mass-production at a reasonable cost.

BRIEF SUMMARY OF THE INVENTION

In accordance with the present invention, a handheld, battery-operated device is disclosed that has rotating protrusions or tines to act as a mini-tiller, with the capability of additional applications. It may be advantageously operated by pulling the tool towards the user as the tines are spinning (in the direction that opposes the pulling motion), thus ripping up weeds and turning the soil.

Furthermore, when the device is turned on its side, it functions as a soil digger/auger for making holes for transplants. The device can also be used for mixing compost piles and soil mixtures.

In one broad aspect of the present invention, the apparatus may comprise a bit or tool that may be selectively attached to a standard drill, Dremel tool, or other motorized power tool.

In accordance with the present invention, the gardening apparatus includes a shaft for being operatively connected to and rotated by a motor The apparatus includes at least one vane extending from the shaft having a plurality of tines extending from the vane. The vane has a raised wall extending therefrom.

In one preferred form of the present invention, the raised wall connects to the tines. Preferably, the raised wall is arcuate, defining a convex side facing the shaft and a concave side facing away from the shaft.

In one aspect of the present invention, the vane further includes an aperture therein.

In another aspect of the present invention, the vane terminates in a distal point aligned with a central rotational axis of the shaft.

In yet another aspect of the present invention, the apparatus includes at least three vanes. Preferably, the vanes are spaced about 120 apart around a central rotational axis of the shaft.

In another preferred embodiment, the tines of the three vanes extend in the same rotational direction relative to a central axis defined by the shaft.

In another broad aspect of the present invention, the gardening apparatus includes a handpiece having a power source, a motor, and a drive system operatively connected between the motor and the shaft. Preferably, the handpiece further includes a second shaft operatively connected to the drive system. The second shaft is oriented opposite to the first shaft, and the second shaft has at least one vane extending therefrom and having a plurality of tines extending therefrom. The vane of the second shaft has a raised wall extending therefrom.

In another aspect of the present invention, the drive system of the handpiece is configured to rotate the first shaft and the second shaft in the same rotational direction.

In another broad aspect of the present invention, a method of using the gardening apparatus includes the first step of obtaining the gardening apparatus. The gardening apparatus is of the type that includes a shaft for being operatively connected to and rotated by a motor The apparatus includes at least one vane extending from the shaft having a plurality of tines extending from the at least one vane. The at least one vane has a raised wall extending therefrom. The method includes the step of operatively connecting the gardening apparatus to a motor. The method includes a further step of rotating the shaft of the gardening apparatus with the motor to drive the tines against soil to till the soil.

In one preferred method of the present invention, the method includes the further step of rotating the shaft of the gardening apparatus with the motor to drive a distal end of the shaft against soil to form a hole in the soil.

In another broad aspect of the present invention, a method of using the gardening apparatus includes obtaining a gardening apparatus. The gardening apparatus is of the type that includes a shaft for being operatively connected to and rotated by a motor The apparatus includes at least one vane extending from the shaft having a plurality of tines extending from the at least one vane. The at least one vane has a raised wall extending therefrom. The gardening apparatus further includes a handpiece having a power source, a motor, and a drive system operatively connected between the motor and the shaft. The handpiece further includes a second shaft operatively connected to the drive system. The second shaft is oriented opposite to the first shaft, and the second shaft has at least one vane extending therefrom and having a plurality of tines extending therefrom. The vane of the second shaft has a raised wall extending therefrom. The method includes the step of energizing the motor of the handpiece, and the step of rotating the shaft and the second shaft of the gardening apparatus with the motor to drive the tines of the vanes against soil to till the soil. Preferably, the method includes the further step of rotating at least one of the shaft or second shaft of the gardening apparatus with the motor to drive a distal end of at least one of the shaft or second shaft against soil to form a hole in the soil.

Other features and advantages will become readily apparent from the accompanying drawings and the appended claims.

BRIEF DESCRIPTION OF THE DRAWINGS

FIG. 2 shows the operative vane of the apparatus;

FIG. 5 shows a simplified, schematic arrangement of an alternative drive system for operating the rotating vanes of the apparatus;

DETAILED DESCRIPTION OF THE PREFERRED EMBODIMENTS

Figure 1:
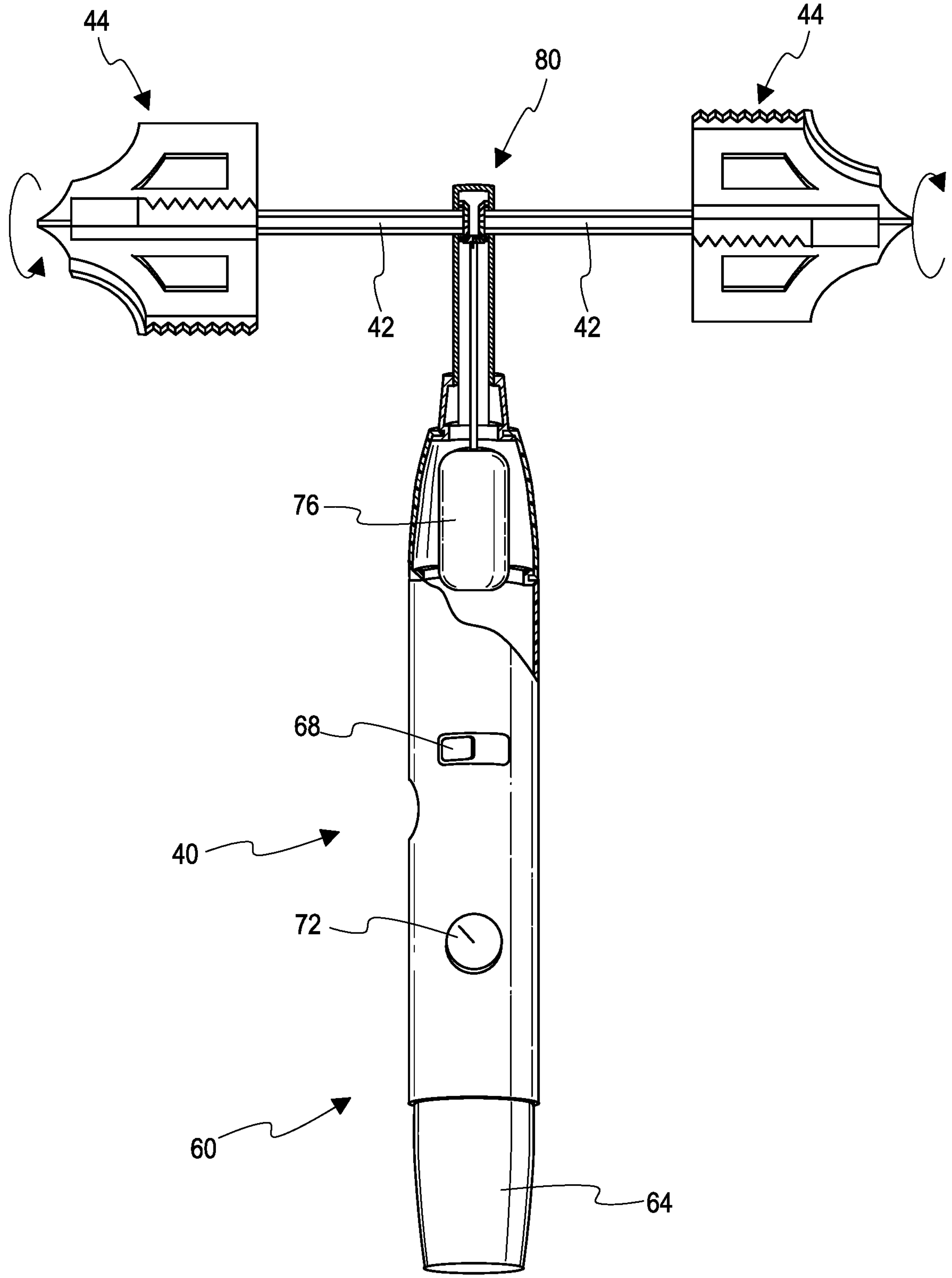
FIG. 1 is a fragmentary, front elevation view of a gardening apparatus according to the present invention, wherein the apparatus is configured with a motorized handpiece with opposing rotating vanes.
Figure 2:
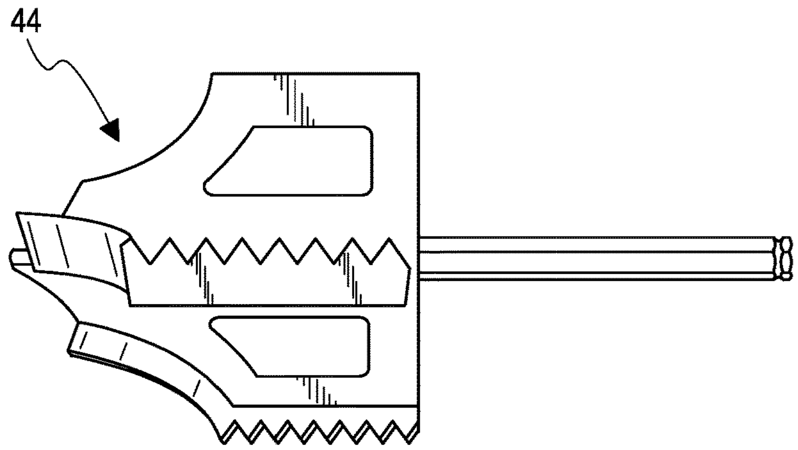
FIG. 2 is a side elevation view of just one of the vanes of the apparatus of FIG. 1.

While the present invention is susceptible of embodiment in various forms, there is shown in the drawings and will hereinafter be described the presently preferred embodiment, with the understanding that the present disclosure should be considered as an exemplification of the invention and is not intended to limit the invention to the specific embodiment illustrated.

In accordance with the illustrated preferred embodiment of the invention, and components thereof, as illustrated in the attached figures, the invention has the form of a device or an apparatus 40. The most basic form of the apparatus 40 is that of an interchangeable bit for being attached to the chuck of a power tool or other electric handheld device that may impart rotation to the apparatus 40, as is shown in FIGS. 6-10.

Figure 6:
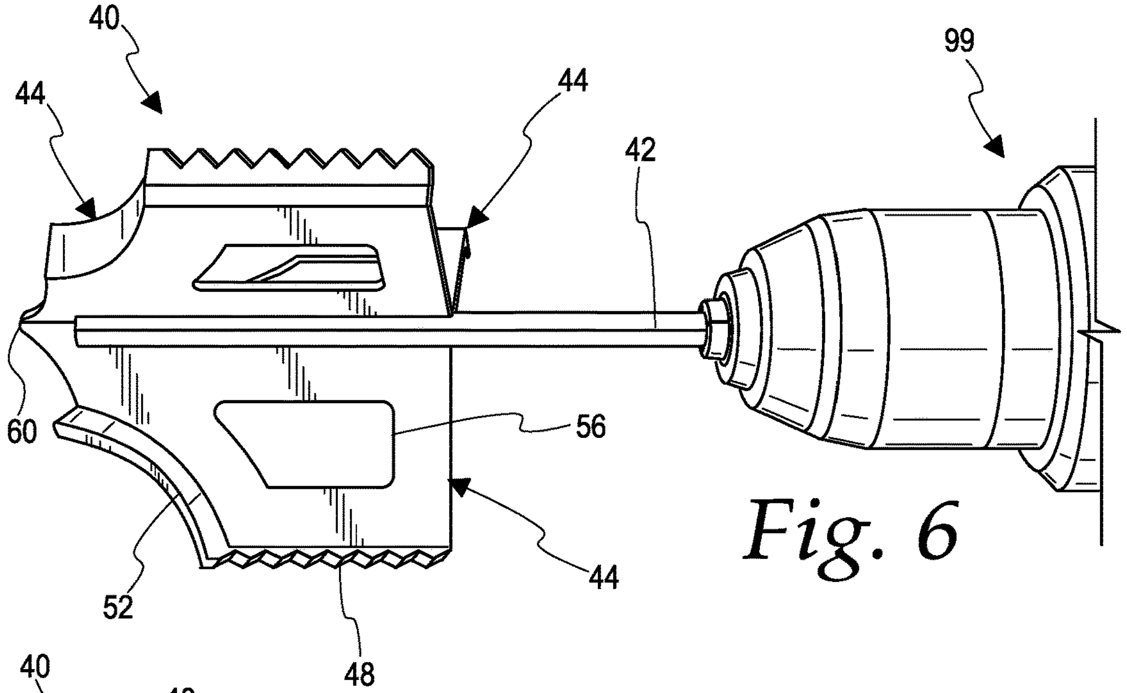
FIG. 6 is a fragmentary, side elevation view of another embodiment of a gardening apparatus according to the present invention, wherein the apparatus is configured to be attached to a commercially available power drill.
Figure 7:
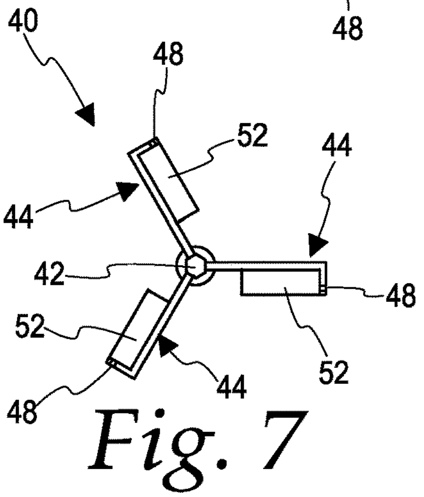
FIG. 7 is a top elevation view of the apparatus of FIG. 6 with the power drill omitted.
Figure 8:
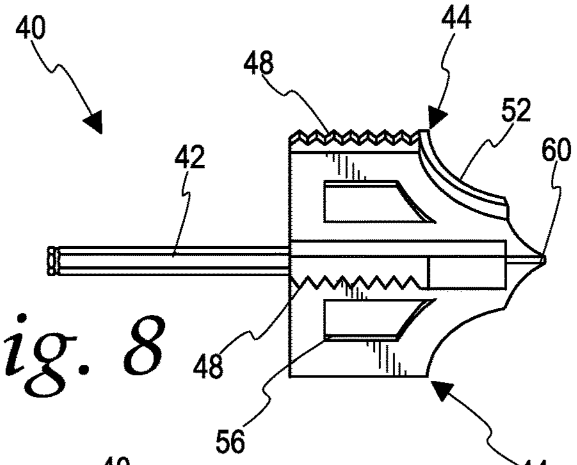
FIG. 8 is a right side elevation view of the apparatus of FIG. 7.
Figure 9:
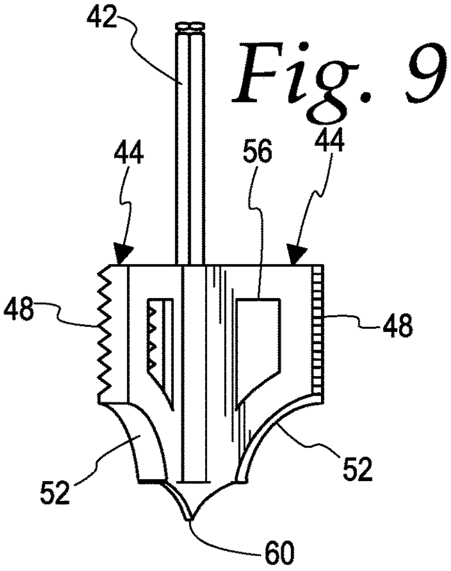
FIG. 9 is a front elevation view of the apparatus of FIG. 7.
Figure 10:
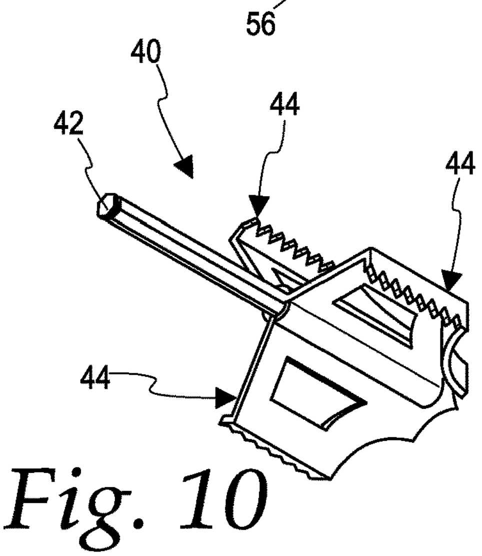
FIG. 10 is an isometric view of the apparatus of FIG. 7, taken from above and the right-front side.

With reference to FIG. 6, the apparatus 40 includes a central shaft 42 for being received within the chuck or attachment means of the power tool 99. The shaft 42 includes at least one vane 44 extending radially therefrom. Preferably, the apparatus 40 includes three vanes 44 extending from the shaft 42 in a symmetric fashion, spaced about 120 degrees apart from one another. Each vane 44 is substantially planar and includes a set of tines 48 and a wall 52 extending substantially perpendicularly from the main portion of the planar vane 44. The tines 48 preferably have the form of triangular, serrated teeth to cut through plant matter and adequately till the soil. The wall 52 preferably connects to the tines 48 and has an arcuate shape with a convex side facing inward toward the rotational axis defined by the shaft 42 and a concave side facing outward away from the shaft 42. The shape of the wall 52 functions both to assist in scooping soil during tilling (e.g., FIG. 3) with the apparatus 40, but also to assist in hole formation during a drilling operation (e.g., FIG. 4).

Figure 3:
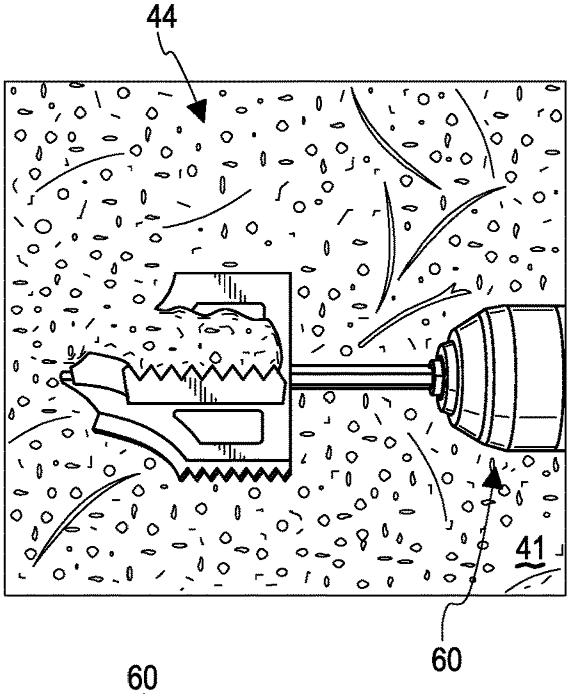
FIG. 3 is a fragmentary, side elevation view of the apparatus of FIG. 1 being used to till soil in a first configuration of the apparatus.
Figure 4:
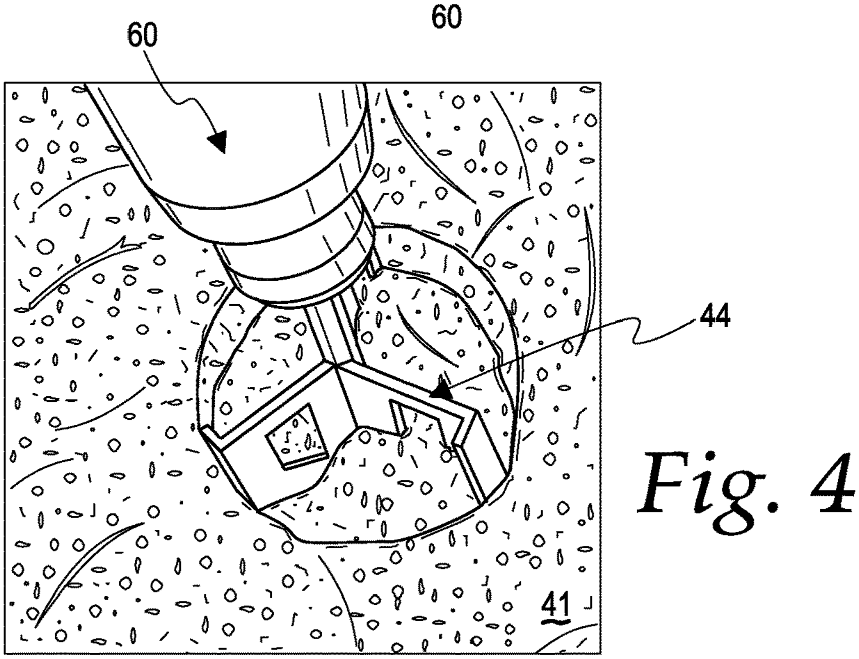
FIG. 4 is a fragmentary, isometric view from the rear of the apparatus of FIG. 1 being used to dig out a weed in soil in a second configuration of the apparatus.

Still referring to FIG. 6, the vanes 44 each include a central aperture 56 to reduce weight of the apparatus 40 and to allow for disturbed soil to pass through the vane 44 during rotation. The vanes 44 terminate in a pointed distal end 60 centered on the rotational axis of the shaft 42. Exemplary tilling and auguring operations with the apparatus 40 are shown in FIGS. 3 and 4, respectively.

The device 40 can be made from any strong metal (e.g., iron, steel, aluminum, etc.), and may be unitarily formed or an assembly of smaller components (not preferred).

Another preferred form of the apparatus 40 of the present invention is that of a handheld device including one or more bits as described above, and this is shown in FIGS. 1 and 5.

With reference to FIG. 1, this further embodiment of the apparatus 40 includes two of the aforementioned bits, each including a central shaft 42 for being received within the drive mechanism or system of a powered handpiece 60. Each shaft 42 includes at least one vane 44 extending radially therefrom. Preferably, each shaft 42 includes three vanes 44 extending from the shaft 42 in a symmetric fashion, spaced about 120 degrees apart from one another. Each vane 44 is substantially planar and includes a set of tines 48 and a wall 52 extending substantially perpendicularly from the planar vane 44. The tines 48 preferably have the form of triangular, serrated teeth to cut through plant matter and adequately till the soil. The wall 52 preferably connects to the tines 48 and has an arcuate shape with a convex side facing inward toward the shaft 42 and a concave side facing outward away from the shaft 42. The shape of the wall 52 functions both to assist in scooping soil during tilling with the apparatus 40, but also to assist in hole formation during a drilling operation.

An additional embodiment of the apparatus 40 (not illustrated) may be provided with different shaped protrusions or tines 48 for use with different tilling or weed killing needs of the user. For example the tines 48 might be semi-circular, polygonal, or irregularly shaped.

Figure 5:
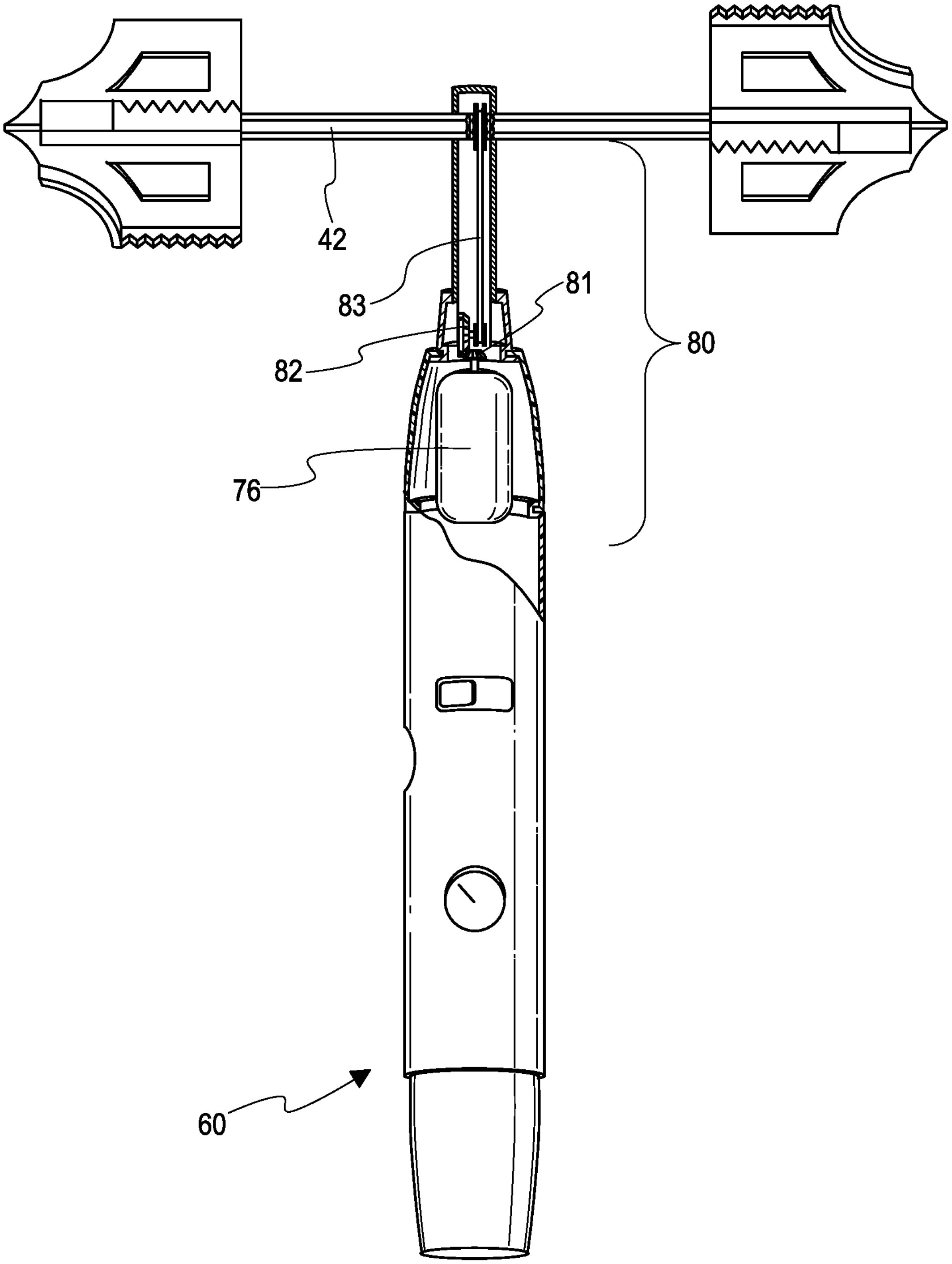
FIG. 5 is a fragmentary, front elevation view of another embodiment of the apparatus of FIG. 1.

Referring to FIGS. 1 and 5, the powered handpiece or hand grip 60 includes a power source 64, such as a lithium ion battery or other low weight portable power source. The handpiece includes a power switch 68 for energizing the motor 76 and drive system 80. An optional speed control switch 72 may be provided to change the rotational output of the drive system 80 and the rotation of the vanes 44. The drive system 80 of the apparatus 40 may be an axially rotating shaft, as defined by the central axis of the hand piece 60 and any means (e.g., drive gear 81, bevel gears 82, pulleys 83, worm gears, etc.) as is known in the art to transfer rotational movement of the motor to the shafts 42 and the vanes 44. It will be understood that the opposite bits of the apparatus 40 may need to be reversed depending on the drive system 80 configuration. For example, if the oppositely-facing shafts 42 of the bits are connected, then the tines 48 and wall 52 on the left hand side will need to extend from the opposite rotational side of their respective vanes 44 on the right hand side. However, if the oppositely-facing shafts 42 of the bits are not-connected, then the identical bits.

The inventors believe that the apparatus 40 may be especially advantageous among older people who cannot lift heavy tilling or gardening equipment, nor have the strength to pull tough weeds. The apparatus 40 may further till soil and perform weed removal operations without disturbing other desirable plants in a close proximity.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

The invention claimed is:

1. A gardening apparatus comprising:

a shaft for being operatively connected to and rotated by a motor; and a plurality of planar vanes extending radially from said shaft in a plane containing a central axis of said shaft, each one of said plurality of vanes having a plurality of tines extending tangentially from said vane, and each one of said plurality of vanes having a raised wall extending therefrom, said raised wall connecting to said tines and being arcuate, defining a convex side facing said shaft and a concave side facing away from said shaft.

2. The gardening apparatus according to claim 1 wherein each one of said plurality of vanes further comprises an aperture therein.

3. The gardening apparatus according to claim 1 wherein said plurality of vanes terminate in a distal point.

4. The gardening apparatus according to claim 1 wherein said plurality of vanes comprises at least three vanes.

5. The gardening apparatus according to claim 4 wherein said tines of said at least three vanes extend in the same rotational direction relative to said central axis defined by said shaft.

6. The gardening apparatus according to claim 1 further comprising a handpiece, said handpiece having a power source, a motor, and a drive system operatively connected between said motor and said shaft.

7. The gardening apparatus according to claim 6 wherein said handpiece further comprises a second shaft operatively connected to said drive system, said second shaft being oriented in an opposite direction of said shaft, and said second shaft having a plurality of planar vanes extending radially from said second shaft in said plane containing a central axis of said second shaft and each one of said plurality of vanes having a plurality of tines extending tangentially therefrom, and each one of said plurality of vanes having a raised wall extending therefrom, said raised wall connecting to said tines and being arcuate, defining a convex side facing said second shaft and a concave side facing away from said second shaft.

8. The gardening apparatus according to claim 7 wherein said drive system of said handpiece is configured to rotate said shaft and said second shaft in the same rotational direction.

9. A method of using a gardening apparatus, said method comprising the steps of:

obtaining the gardening apparatus of claim 1;

operatively connecting said gardening apparatus to a motor; and rotating said shaft of said gardening apparatus with said motor to drive said tines against soil to till said soil.

10. The method of using the gardening apparatus according to claim 9 further comprising the step of:

rotating said shaft of said gardening apparatus with said motor to drive a distal end of said shaft against said soil to form a hole in said soil.

11. A method of using a gardening apparatus, said method comprising the steps of:

obtaining a gardening apparatus, said gardening apparatus having a shaft for being operatively connected to and rotated by a motor, said gardening apparatus further having a plurality of planar vanes extending radially from said shaft in a plane containing a central axis of said shaft, each one of said plurality of vanes having a plurality of tines extending tangentially from said vane, and each one of said plurality of vanes having a raised wall extending therefrom, said raised wall connecting to said tines and being arcuate, defining a convex side facing said shaft and a concave side facing away from said shaft, said gardening apparatus further having a handpiece, said handpiece having a power source, a motor, and a drive system operatively connected between said motor and said shaft, said handpiece further having a second shaft operatively connected to said drive system, said second shaft being oriented in an opposite direction of said shaft, and said second shaft having a plurality of planar vanes extending radially from said second shaft in a plane containing a central axis of said second shaft, each one of said plurality of vanes having a plurality of tines extending tangentially from said vane, and each one of said plurality of vanes having a raised wall extending therefrom, said raised wall connecting to said tines and being arcuate, defining a convex side facing said second shaft and a concave side facing away from said second shaft;

energizing said motor of said handpiece; and rotating said shaft and said second shaft of said gardening apparatus with said motor to drive said tines of said plurality of vanes against soil to till said soil.

12. The method of using the gardening apparatus according to claim 11 further comprising the step of:

rotating said shaft and said second shaft of said gardening apparatus with said motor to drive a distal end of at least one of said shaft and said second shaft against said soil to form a hole in said soil.

* * * * *